(No Model.)

B. H. BLANK.
OPERA GLASS.

No. 264,130.          Patented Sept. 12, 1882.

WITNESSES:
Gustave Dieterich
Otto Risch

INVENTOR
Bernard H. Blank
BY Paul Goepel
ATTORNEY

UNITED STATES PATENT OFFICE.

BERNARD H. BLANK, OF NEW YORK, N. Y.

OPERA-GLASS.

SPECIFICATION forming part of Letters Patent No. 264,130, dated September 12, 1882.

Application filed March 7, 1882. (No model.)

*To all whom it may concern:*

Be it known that I, BERNARD H. BLANK, of the city, county, and State of New York, have invented certain new and useful Improvements in Opera-Glasses, of which the following is a specification.

This invention has reference to improvements in opera-glasses, whereby the usefulness of the same is considerably enhanced, as the ocular may be adjusted for the focus of either eye separately, and also one or both eye-pieces and bodies of the glass removed from the frame, to be used separately, like a telescope.

The invention consists of an opera-glass having a centrally-jointed frame, which supports the bodies and eye-pieces of the glass. The ocular of one eye-piece is adjusted by rack and pinion, so as to be set for the focus of either eye. One or both bodies and eye-pieces are made detachable from the frame by arranging it so as to admit the removal of one or both bodies and eye-pieces.

Figure 1:
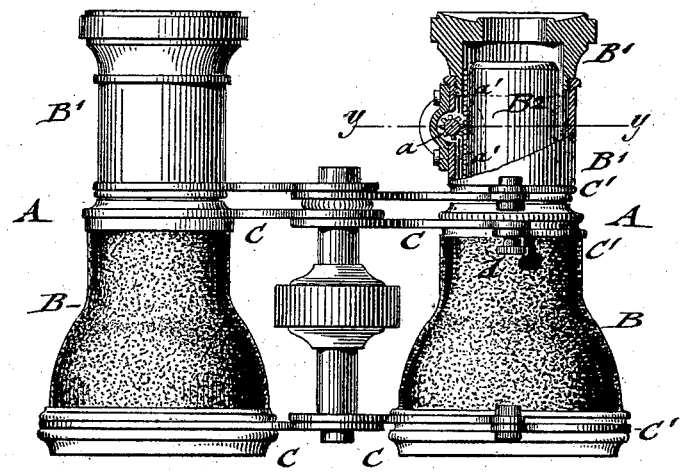
Figure 2:
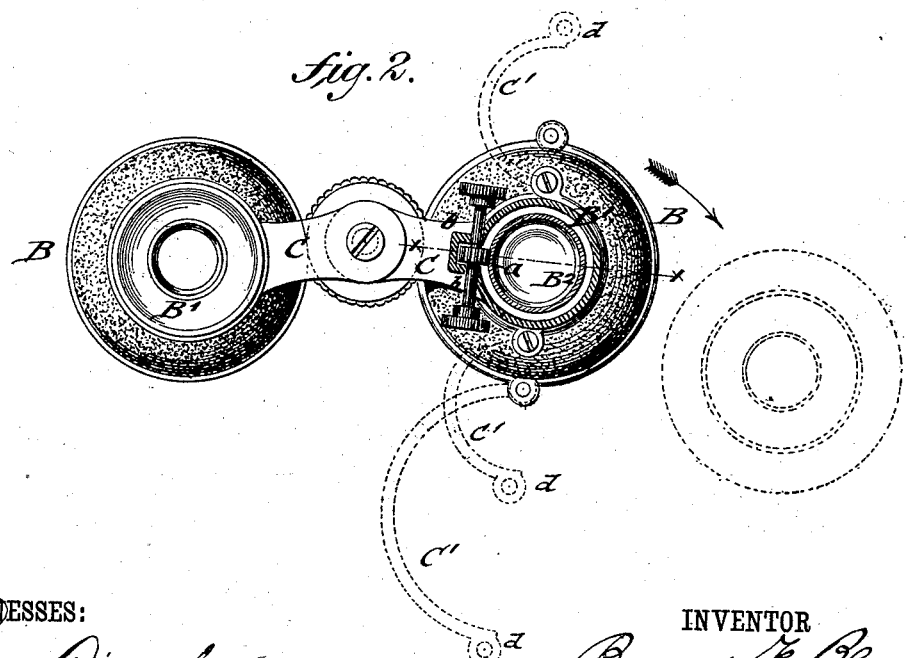

In the accompanying drawings, Figure 1 represents a side elevation of my improved opera-glass, partly in section on line $x\,x$, Fig. 2. Fig. 2 is a plan view of the same, partly in section on line $y\,y$, Fig. 1, the dotted lines showing the frame opened for detaching one eye-piece and body of the glass.

Similar letters of reference indicate corresponding parts.

A represents an opera-glass, the bodies B B and eye-pieces B' B' of which are supported in the usual manner by an articulated frame, C C, whereby the bodies and eye-pieces may be set to the exact distance of the eyes from each other by placing the frame-sections at an obtuse angle to each other, as shown in Fig. 2. The eye-pieces B' B' are adjusted and moved away or toward the object-glasses of the bodies B B by the usual mechanism. One of the eye-pieces B' is provided with an interior tube, $B^2$, which contains the ocular, and which is adjusted by means of a pinion, $a$, that is supported in bearings of the eye-piece B' and turned in either direction by its shaft $b$, having a milled head at each end. The pinion engages a rack, $a'$, in the side of the interior adjustable tube, $B^2$, of the ocular, so as to move it in either direction within the eye-piece. This arrangement admits of the adjustment of the ocular of one of the eye-pieces B' of the glass to the exact focus of either eye, whether the same be the right or left eye, after the opera-glass has been adjusted to the focus of the other eye. By means of the articulated frame C the adjustable ocular of the opera-glass may be set to be used for either eye whichever may require the same. As the power of vision of both eyes with most people is unequal, the adjustable ocular forms a very advantageous feature in connection with the articulated frame of the opera-glass, as thereby not only the eye-pieces can be adjusted to the exact width of the eyes, but also to the exact focus required for each eye.

One or both bodies B B and eye-pieces B' B' are so connected to the frame C C that they may be detached therefrom, so as to be used independently of the opera-glass as a telescope or spy-glass. For this purpose that part of the frame C which supports the body B and eye-piece B' is provided with semicircular sections C', which are hinged at one side of the frame and locked at the opposite side by means of clamps, screws, spring-catches, or other suitable fastenings devices, $d$, as shown clearly in the drawings.

In place of the hinged sections C' and fastening devices $d$, the sections of the frame C may be constructed in any other equivalent manner—as, for instance, in the form of spring-clasps that embrace the body and eye-piece, or in any other suitable manner—provided one body and one eye-piece of the glass or both may be made removable from the frame. The detaching of that body and eye-piece, provided with the adjustable ocular, forms an additional advantageous feature of my improved opera-glass, as it may thereby be made to serve with but little extra expense as a spy-glass for use at country or watering places.

The improvements are also applicable to field-glasses, as thereby their efficiency for practical use is greatly enhanced.

Having thus described my invention, I claim as new and desire to secure by Letters Patent—

1. Opera-glasses provided with a centrally-hinged frame for adjusting the distance between the bodies, means for adjusting the distance between the eye-glasses and object-glasses, an interior tube carrying an ocular, and means for adjusting said tube independently of the adjustment of the glasses in the body, substantially as described.

2. Opera-glasses provided with an adjustable tube, $B^2$, carrying an ocular, in combination with the rack and pinion, and eye-pieces $B'B'$, substantially as described.

3. The combination, in an opera-glass, of the supporting-frame, which is adapted to be opened and closed, with a detachable eye-piece and body, substantially as set forth.

4. In an opera-glass, the combination, with the supporting-frame, one half of which is provided with hinged sections and fastening devices, whereby the frame may be opened and closed, of a body and eye-piece, which may be detached by opening the frame-sections and replaced by locking the same, substantially as set forth.

In testimony that I claim the foregoing as my invention I have signed my name in presence of two subscribing witnesses.

BERNARD H. BLANK.

Witnesses:
PAUL GOEPEL,
CARL KARP.